No. 720,990. PATENTED FEB. 17, 1903.
J. G. WILLIAMS.
INSECT TRAP.
APPLICATION FILED AUG. 9, 1902.
NO MODEL.
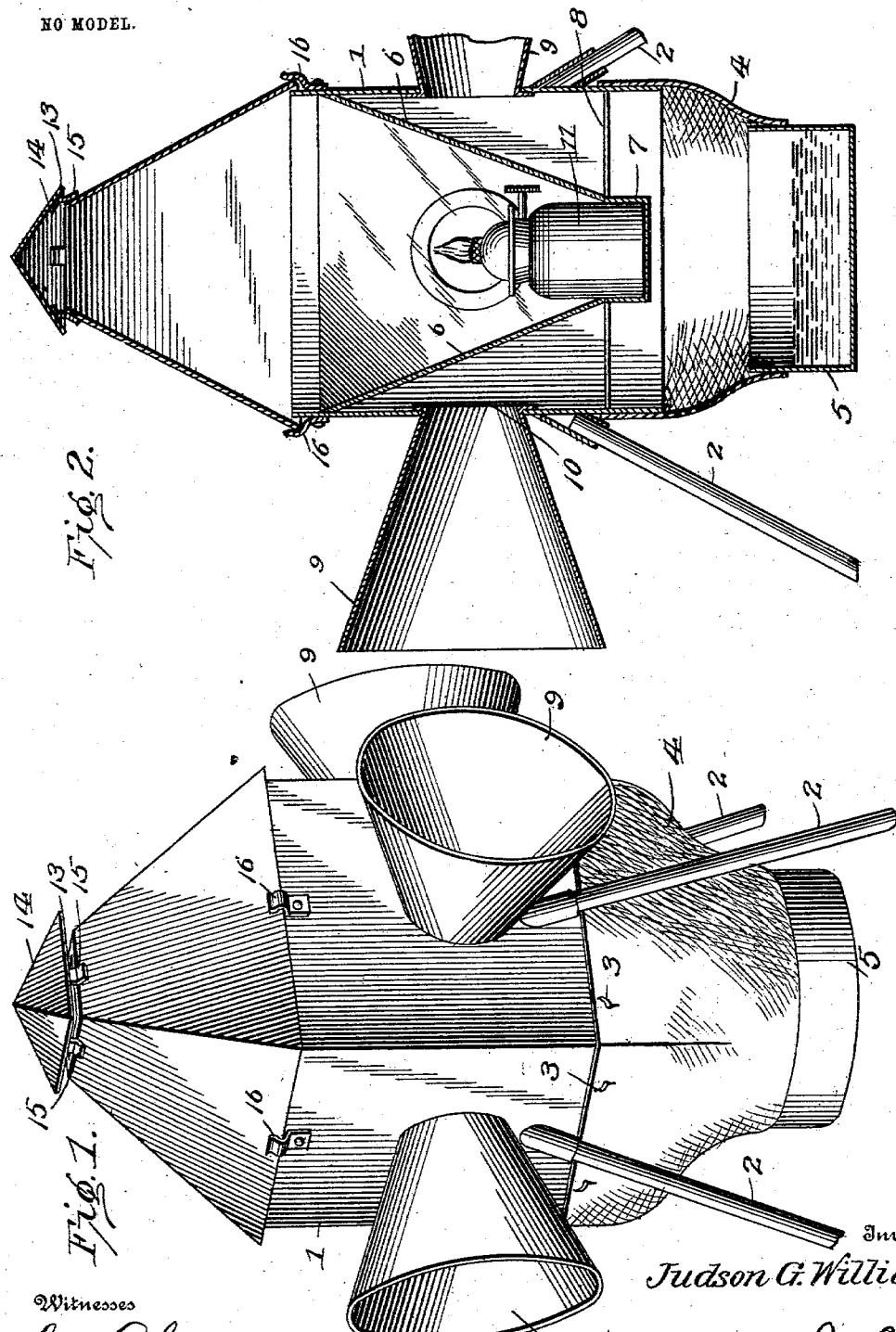
Witnesses
Geo. Ackman.
B. I. Funk.
Inventor
Judson G. Williams
By Victor J. Evans
Attorney

UNITED STATES PATENT OFFICE.

JUDSON G. WILLIAMS, OF KISERTON, KENTUCKY.

INSECT-TRAP.

SPECIFICATION forming part of Letters Patent No. 720,990, dated February 17, 1903.

Application filed August 9, 1902. Serial No. 119,083. (No model.)

*To all whom it may concern:*

Be it known that I, JUDSON G. WILLIAMS, a citizen of the United States, residing at Kiserton, in the county of Bourbon and State of Kentucky, have invented certain new and useful Improvements in Insect-Traps, of which the following is a specification.

This invention relates to insect-traps; and the object thereof is to provide a cheap, durable, and efficient device which may be portable and which can effectually be used to entice the insects within a shell or casing and effect their destruction through the medium of poisonous vapors of liquid contained within a suitable receptacle.

With this object in view the invention consists in certain novel parts and details of construction, all of which will be specifically described hereinafter, and illustrated in the accompanying drawings, in which—

Figure 1 is a perspective view of an insect-trap constructed in accordance with my invention, and Fig. 2 is a vertical longitudinal sectional view through the same.

In carrying out the invention I provide a shell or casing 1, which is preferably substantially rectangular in form and closed on all four sides, the top and bottom, however, being open. This shell or casing is supported by suitable standards or legs 2, and around the lower edge of the ends are outwardly and upwardly projecting hooks 3, which are designed to project through and support a flexible band 4, consisting of suitable fibrous material and carrying at its lower extremity a suitable metallic pan or other liquid-containing receptacle 5, which is fastened to the band 4 by any suitable method.

Leading from the top of the shell or casing 1 and projecting downwardly are a plurality of inwardly-inclined screens 6, which consist of suitable transparent material, preferably glass, there being four screens for the four sides of the shell or casing 1. These screens are arranged edge to edge, their lower portions being narrower than the top, so that at their lower extremities the meeting edges form a square opening which bears against the top of a suitable lamp-bracket 7, which is supported within the shell by means of brace-rods or supports 8.

Projecting from each side of the casing 6 is a cone-shaped inlet-tube 9, which is flared outward, so as to permit the ingress of the insects and readily attract them, the opening 10 in the casing 1, which is surrounded by the tube 9, being arranged opposite one of the screens in the casing 1, so that the light from the lamp 11 will be projected through the screen and through the opening formed by attaching the tube 9 to the shell 1, thereby attracting the insects within the hood or shell.

On the top of the shell 1 is a removable hood 12, pyramidal in form and having a restricted opening 13 at its top, on which is a cap 14, covering the same and spaced apart by cleats 15. The hood 12 rests upon suitable cleats 16, arranged at intervals around the contour of the shell 1, whereby it is supported. A space is provided between the edges of the shell 1 and the hood 12 and between the edges of the hood 12 and the cap 13, whereby ventilation may be had within the shell.

In actual practice the hood can be removed to insert the lamp in its seat, and a suitable insecticide can be placed in the pan or receptacle 5 by removing the belt of the suspending device 4 from engagement with the hooks 3. After the belt is secured in place, the lamp lighted, and the hood placed in its proper position the device will be ready for use. If the trap is situated in a dark place, the rays of light penetrating through the screen and the tubular funnels 9 will attract the insects and other vermin to the approaches of the shell, and following the direction of the light they will finally enter the shell and drop down into the pan 5 to be overcome by the fumes from the insecticide, which will impregnate the atmosphere surrounding the screens 6. After the device has been in use a sufficient length of time the vermin can be removed by unhooking the belt or suspending device 4 from the hooks and emptying the pan 5.

I have described what to me at this time appears to be the very best means of accomplishing the desired result, although I am aware that various slight changes in the form and construction may be made without materially affecting the result or departing from the spirit of the invention. For instance, if desirable, one or more funnels may be employed, according to the requirements; but I prefer in an ordinary construction to employ four, one for each side, as this form is calculated to give the very best results. I therefore would have it understood that I do not limit myself to the exact details of construction shown, but reserve the right to make such slight changes and alterations as would suggest themselves from time to time and properly come within the spirit of this invention.

Having thus described the invention, what is claimed as new, and desired to be secured by Letters Patent, is—

1. An insect-destroyer comprising a shell or casing suitably supported and provided at its lower extremity with outwardly-projecting hooks, a band fastened to the shell by engagement with the hooks, an insecticide-pan carried by said band and means within the shell for attracting the insects.

2. In an insect-destroyer, the combination with a suitable supported shell, of tubular funnels projecting from the sides of the shell, said shell being open at the top and bottom, an insecticide-pan arranged immediately below the open bottom of the shell, and means for securing said pan to the shell, a screen having four sides, the sides being secured at their top edges to the shell and inclined inwardly, forming an opening at the vertex of the screen, and a lamp-bracket within the shell and on the top edges of which the screen rests, said screen and lamp being opposite the funnel.

3. In an insect-destroyer, the combination with a hollow shell, standards for supporting the same, a removable belt secured to the lower edges of the shell and carrying an insecticide-receptacle, a removable hood on the top of the shell, the edges of which are spaced apart from the edges of the shell, a screen within the shell comprising four sides and in the form of an inverted pyramid, and funnels horizontally disposed with relation to the shell and having their flared ends projecting outward, said funnels being arranged diametrically opposite each other and opposite the screen, for the purpose set forth.

In testimony whereof I affix my signature in presence of two witnesses.

JUDSON G. WILLIAMS.

Witnesses:
JAS. A. STEWART,
JOS. H. EWALT.